United States Patent

Sugiyama

[11] Patent Number: 5,870,147
[45] Date of Patent: Feb. 9, 1999

[54] PREDICTIVE VIDEO SIGNAL CODING AND DECODING WITH SUPPRESSION OF LOW FREQUENCIES

[75] Inventor: Kenji Sugiyama, Yokosuka, Japan

[73] Assignee: Victor Company of Japan, Ltd., Yokohama, Japan

[21] Appl. No.: 890,216

[22] Filed: Jul. 9, 1997

Related U.S. Application Data

[62] Division of Ser. No. 731,124, Oct. 9, 1996, which is a division of Ser. No. 286,205, Aug. 5, 1994, abandoned, which is a continuation of Ser. No. 967,869, Oct. 29, 1992.

[30] Foreign Application Priority Data

Oct. 29, 1991 [JP] Japan .................................. 3-309888

[51] Int. Cl.$^6$ ................................................ H04N 7/32
[52] U.S. Cl. ........................................ 348/409; 348/415
[58] Field of Search .................................. 348/397, 400, 348/401, 402, 409, 415, 416, 390, 384; H04N 7/137

[56] References Cited

U.S. PATENT DOCUMENTS

| 4,665,436 | 5/1987 | Osborne et al. | 358/136 |
| 4,782,387 | 11/1988 | Sabri et al. | 358/133 |
| 4,942,465 | 7/1990 | Ohta | 358/133 |
| 4,985,768 | 1/1991 | Sugiyama | 348/402 |
| 4,987,490 | 1/1991 | Ohta | 358/136 |
| 5,126,841 | 6/1992 | Tanaka et al. | 348/415 |
| 5,142,362 | 8/1992 | Masera et al. | 348/415 |
| 5,144,426 | 9/1992 | Tanaka et al. | 348/409 |

FOREIGN PATENT DOCUMENTS

| 0 370 315 | 5/1990 | European Pat. Off. . |
| 0 416 918 | 3/1991 | European Pat. Off. . |

OTHER PUBLICATIONS

Communications of the Association for Computing Machinery, vol. 34, No. 4, Apr. 1991, pp. 46–58.
IEEE Transactions on Communications, vol. 37, No. 4, Apr. 1989, pp. 380–386.
Transactions of the Institute of Electronics and Communication Engineers of Japan, Section E, vol. E70, No. 7, Jul. 1987.
Patent Abstracts of Japan, vol. 6, No. 128, (E–118), Sep. 20, 1980.

*Primary Examiner*—Bryan Tung
*Attorney, Agent, or Firm*—Jacobson, Price, Holman & Stern, PLLC

[57] ABSTRACT

In a predictive coding apparatus, an interframe/interfield predictive signal is generated in which low frequency components are depressed. A predictive error signal is generated on the basis of an input video signal and the interframe/interfield predictive signal. The predictive error signal is then interframe/interfield-coded. In a predictive decoding apparatus, a code transmitted from the coding apparatus is interframe/interfield-decoded to obtain a decoded signal. An interframe/interfield predictive signal is generated in which low frequency components are depressed. The video signal is then reproduced by adding the decoded signal and the predictive signal.

2 Claims, 5 Drawing Sheets

FIG. 3
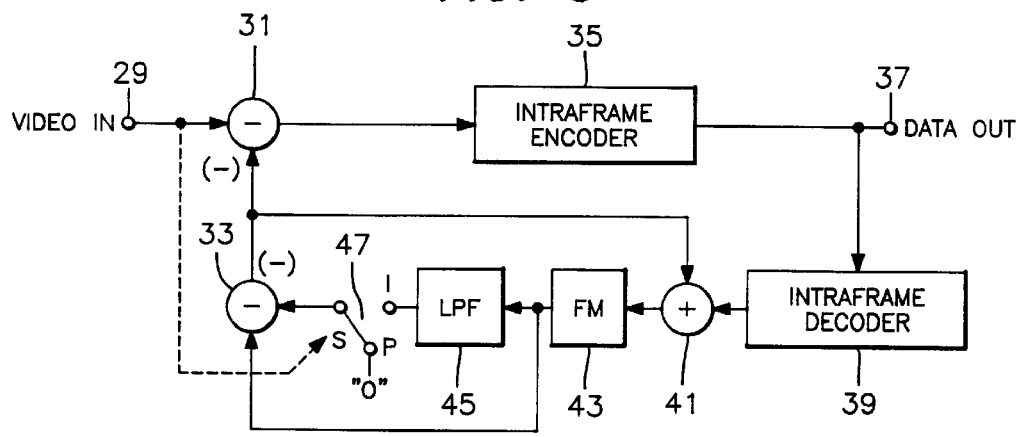
FIG. 4
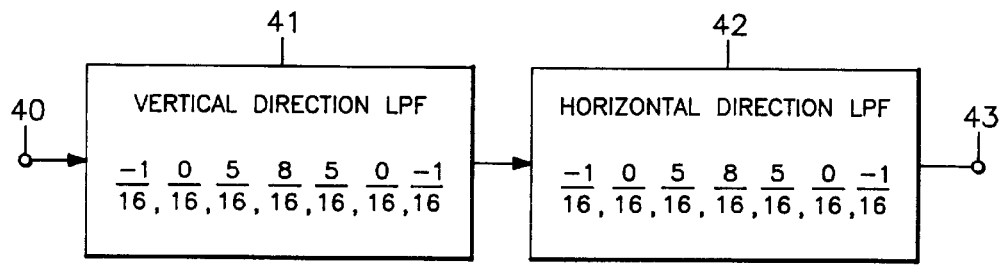
FIG. 5(a)      FIG. 5(b)      FIG. 5(c)      FIG. 5(d)
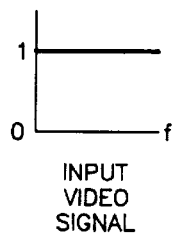      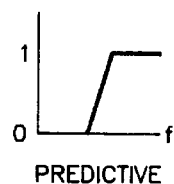      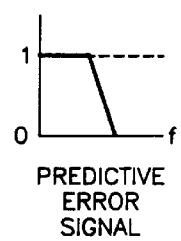      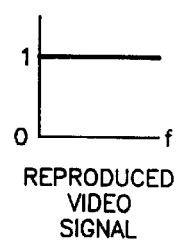
INPUT          PREDICTIVE      PREDICTIVE      REPRODUCED
VIDEO          SIGNAL          ERROR           VIDEO
SIGNAL                         SIGNAL          SIGNAL

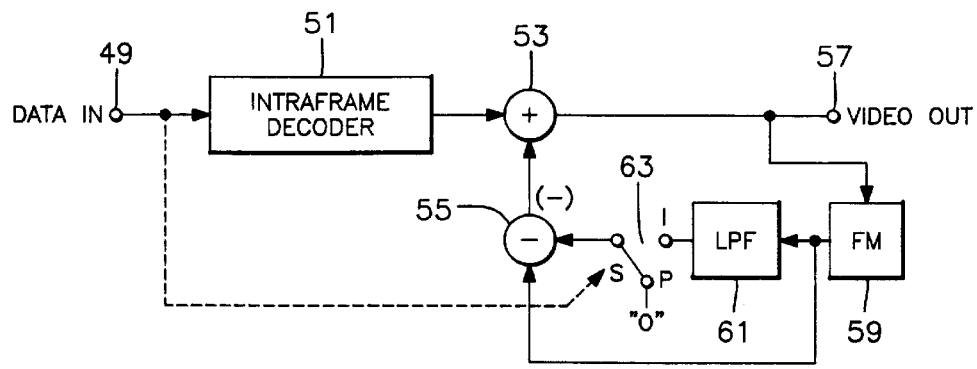
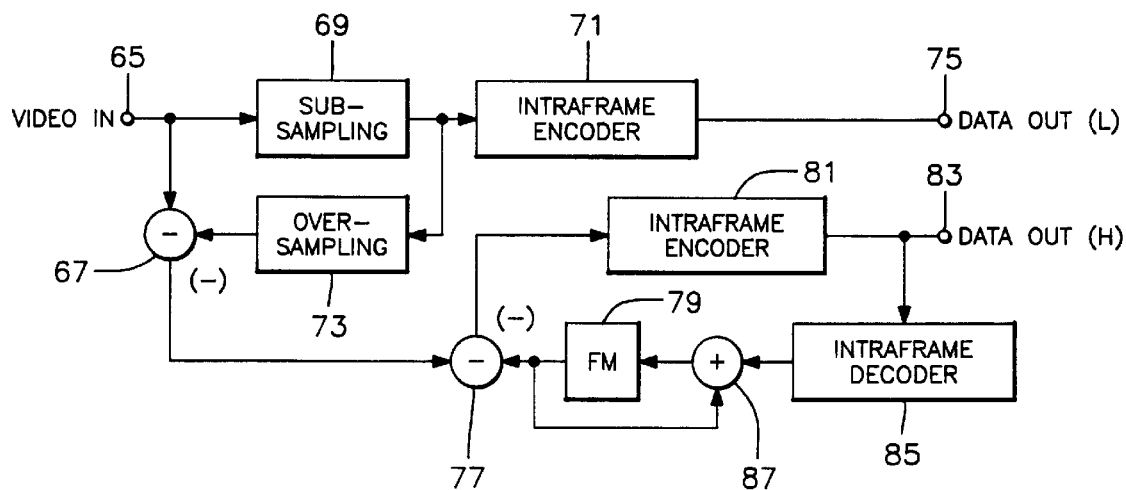
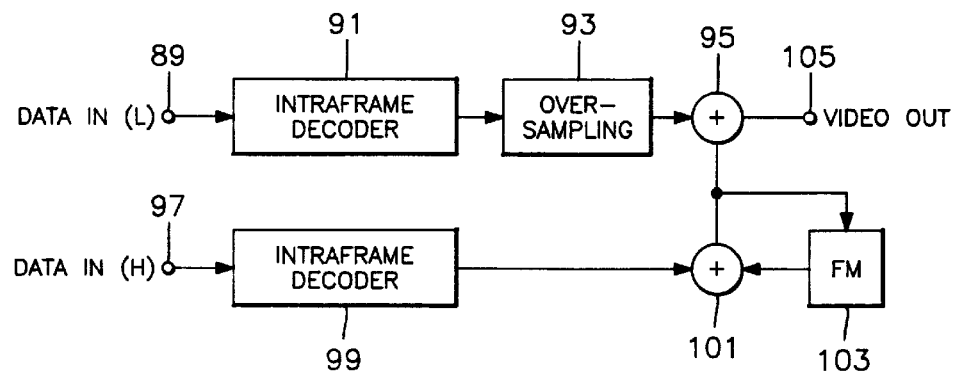

PREDICTIVE VIDEO SIGNAL CODING AND DECODING WITH SUPPRESSION OF LOW FREQUENCIES

This is a divisional of application Ser. No. 08/731,124 filed Oct. 9, 1996 which in turn is a divisional of application Ser. No. 08/286,205 filed Aug. 5, 1994, now abandoned, which is a continuation of Ser. No. 07/967,869, filed Oct. 29, 1992, now abandoned.

BACKGROUND OF THE INVENTION

This invention relates to an apparatus that encodes video signals efficiently with fewer codes and an apparatus that decodes the coded signals, in their use for recording, transmission and display systems, and more particularly to a coding/decoding apparatus for video signals capable of random access and search.

In particular, efficient coding has been realized by interframe predictive coding which utilizes interframe correlation of video signals to predict, from already coded frames, the frames to be coded, and encodes predictive error signals alone.

Furthermore, recent attention has been directed to the technology of motion-compensating interframe prediction to predict motion by moving pictures.

On the other hand, it has been made for the coding for storage media to respond to random access and high-speed search.

A conventional coding apparatus is exemplified in FIG. 1.

In FIG. 1, a video signal applied to a video signal input terminal 1 is led to a predictive subtracter 3, where a predictive signal given via a switch 15 is subtracted from the video signal, thus generating a predictive error signal.

The predictive error signal is encoded by an intraframe encoder 5 into compressed data. The data is outputted via a data output terminal 7 and applied to an intraframe decoder 9 which generates a reproduced predictive error signal.

In an inverse predictive adder 11, a predictive signal is added to the reproduced predictive error signal, thus reproducing the video signal.

The reproduced video signal is stored in a frame memory (FM) 13, and applied to a terminal P of the switch 15 after being delayed by one frame.

The switch 15 is controlled by a synchronous signal separated from the inputted video signal. And, in an independent frame of every N frames, a terminal S is connected to a terminal I, whereas in other predictive frames the terminal S is connected to terminal P.

The terminal P has been supplied with a reproduced video signal of the preceding frame. An interframe predictive coding circuit is formed when the terminal S is connected to the terminal P.

The terminal I has been supplied with a fixed value (0). When the terminal S is connected to the terminal I, the output signal of the predictive subtracter 3 becomes the same as the input video signal, that is, an intraframe independent coding circuit is formed.

FIG. 2 shows a conventional video signal decoding apparatus. In this apparatus, the data supplied from a data input terminal 17 is decoded by an intraframe decoder 19.

And in a reverse predictive adder 21, a predictive signal applied via a switch 27 is added to the decoded signal, thus reproducing the video signal.

The reproduced video signal is outputted via a video signal output terminal 23, and is concurrently stored in a frame memory 25.

The signal is delayed by one frame in the frame memory 25, and then applied to the reverse predictive adder 21 via the switch 27. The switch 27 is controlled by a frame-synchronizing signal separated from the input data as in the case of the coding apparatus.

In the intraframe coding apparatus 5 of FIG. 1a, discrete cosine transform (DCT) is first carried out. The transformed output is then quantized, and the quantized data is variable-length encoded by such codes as Huffman codes.

In the intraframe decoders 9 and 19 of FIGS. 1 and 2, the data coded to variable lengths is first decoded to a fixed length and then transformed to a quantized representative value, which is reversely discrete cosine transformed into a reproduced signal.

Such conventional coding/decoding apparatuses process periodic independent frames. This decreases the coding efficiency because the independent frames produce a large amount of data as compared with the predictive frames.

Independent frames only are reproduced in the high-speed search in storage media. However, if the quantity of data that can be decoded by the high-speed search is the same as that at the time of ordinary regeneration, not all of the independent frames corresponding to the search speed can be decoded and the decoding apparatus comes to deliver the same frames repeatedly. This is so because the independent frames contain a larger amount of data.

Therefore, it has been devised to divide the frequency components of a video signal into a plurality of bands and decode low frequency components only.

Such a measure can reduce the amount of data to be decoded in each frame and provide smooth search pictures even in low resolution, but leaves high frequency components unused.

SUMMARY OF THE INVENTION

In view of the foregoing, it is a purpose of the present invention to provide video signal predictive coding/decoding apparatuses in which intraframe coding is carried out on low frequency components on which the energy of video signals is concentrated and intraframe predictive coding is always carried out on high frequency components.

To achieve the foregoing purpose, the present invention provides an apparatus for coding a video signal.

The apparatus comprises, a first generator for generating an interframe/field predictive signal in which low frequency components are depressed, a second generator for generating a predictive error signal on the basis of an input video signal and the interframe/field predictive signal, and an encoder for intraframe/field-coding the predictive error signal.

Furthermore, the present invention provides an apparatus for decoding a video signal. The apparatus comprises a decoder for intraframe/field-decoding a code transmitted from a coding apparatus to obtain a decoded signal, a generator for generating an interframe/field predictive signal in which low frequency components are depressed, and a reproducer for reproducing the video signal by adding the decoded error signal and the predictive signal.

Still furthermore, the present invention provides an apparatus for coding a video signal. The apparatus comprises a separator for separating an input video signal to be coded into high and low frequency component signals, an encoder for generating an interframe/field predictive error signal on the basis of the high frequency component signal, and a predictive encoder for interframe/field-predictive coding the low frequency component signal and the predictive error signal.

Still furthermore, the present invention provides an apparatus for decoding a video signal. The apparatus comprises a first decoder for intraframe/field-decoding codes of high and low frequency component signals, respectively, which codes have been transmitted from a coding apparatus, thereby to obtain decoded high and low frequency component signals, a first reproducer for adding the decoded high frequency component signal and an interframe/field predictive signal, and a second reproducer for adding the added signal from the above adding means and the decoded low frequency component signal, thereby to obtain a reproduced signal.

BRIEF DESCRIPTION OF THE DRAWINGS

FIG. 3 is a block diagram of an embodiment of a predictive coding apparatus of the present invention;

FIG. 4 illustrates a configuration of a low pass filter (LPF) used for the present invention;

FIGS. 5(a), 5(b), 5(c) and 5(d) show frequency characteristics of signals processed by the coding apparatus shown in FIG. 3;

FIG. 6 is a block diagram illustrating an embodiment of a predictive decoding apparatus corresponding to the coding apparatus shown in FIG. 3;

FIG. 7 is a block diagram of another embodiment of a predictive coding apparatus of the present invention;

FIG. 8 is a block diagram representing an embodiment of a predictive decoding apparatus corresponding to the coding apparatus shown in FIG. 7;

DETAILED DESCRIPTION OF THE PREFERRED EMBODIMENTS

Figure 1:
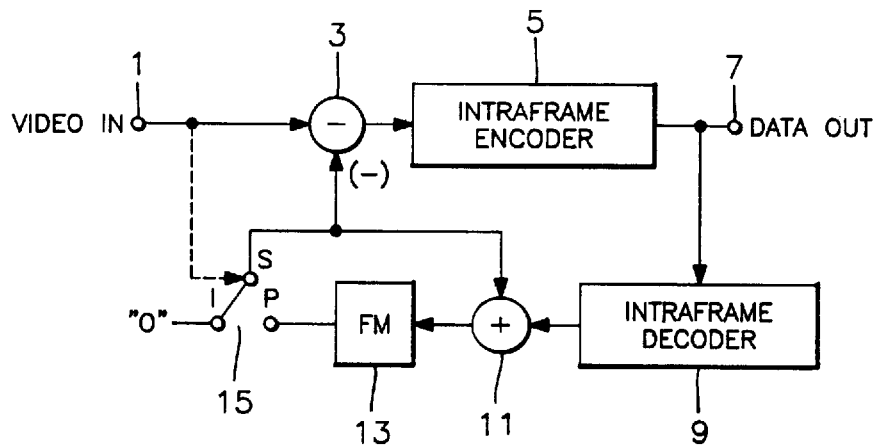
FIG. 1 is a block diagram showing a conventional predictive coding apparatus.
Figure 2:
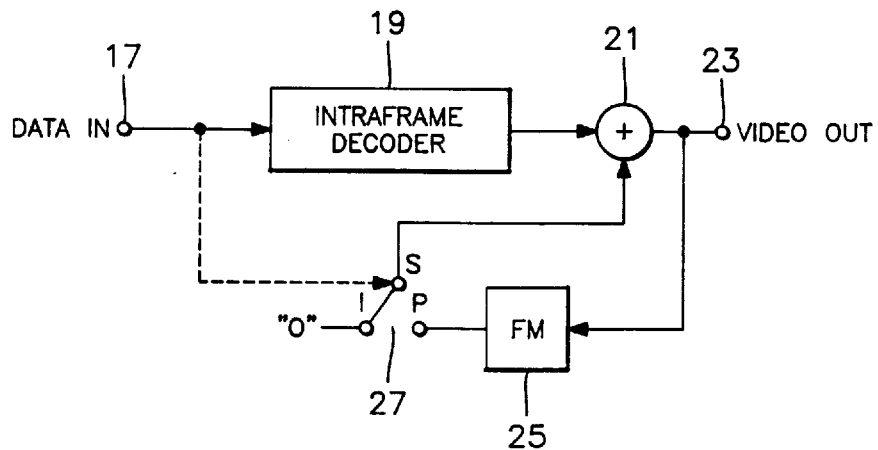
FIG. 2 is a block diagram showing a conventional predictive decoding apparatus.

FIG. 3 is a block diagram illustrating an embodiment of the predictive coding apparatus of the present invention.

In FIG. 3 a video signal applied to a picture signal input terminal 29 is supplied to a predictive subtractor 31. The predictive subtractor 31 subtracts a predictive signal supplied by a subtractor 33 from the input video signal, and sends a generated predictive error signal to an intratrame encoder 35.

The encoder 35 encodes the predictive error signal by intratrame coding and delivers coded data from a data output terminal 37 and also sends the coded data to an intraframe decoder 39.

The predictive signal in the coding apparatus must be composed of an intraframe coded signal in order to be the same signal as a predictive signal in a decoding apparatus described later. Therefore, the intraframe decoder 39 decodes the coded data to generate a reproduced predictive error signal which is then applied to a reverse predictive adder 41.

The adder 41 adds the reproduced predictive error signal and its corresponding predictive signal to generate a reproduced video signal which is then applied to a frame memory (FM) 43.

The frame memory 43 provides a signal delayed by one frame from the input video signal, and sends the delayed signal to a low pass filter (LPF) 45 and the subtractor 33. The output of the LPF 45 is supplied to a terminal I of a switch 47.

The switch 47 is controlled by a synchronous signal separated from the input video signal. In one independent frame of every N frames a terminal S is connected to the terminal I, and in the other frames the terminal S is connected to a terminal P.

The terminal I is supplied with a low frequency component of a reproduced video signal in the frame precedent to the input video signal, whereas terminal P is maintained at a fixed level (0).

When the terminal S of the switch 47 is connected to the terminal P, the subtractor 33 sends out an output signal of the frame memory 43, as it is, and therefore the predictive subtractor 31 makes predictions in the same way as in conventional ones.

On the other hand, when the terminal S of the switch 47 is connected to the terminal I, a low frequency component from LPF 45 is subtracted from the output signal of the frame memory 43, and the resulting predictive signal is delivered from the subtracter 33.

Therefore, when in the predictive subtractor 31 the predictive signal is subtracted from the input video signal, the low frequency component remains and is intraframe-coded in the intraframe encoder 35.

The LPF 45 is a two-dimensional filter using a cascade connection of vertical and horizontal filters as shown in FIG. 4. The numerals in FIG. 4 designate tap factors.

FIGS. 5(a)–5(b) illustrates frequency characteristics of respective signals processed by the predictive coding apparatus of FIG. 3.

The input video signal shown in FIG. 5(a) has all frequency components of the high and low frequencies. In the predictive signal shown in FIG. 5(b) the low frequency component is suppressed.

In the predictive error signal, shown in FIG. 5(c), obtained by subtracting such a predictive signal from the video signal shown in FIG. 5(a), the input video signal remains unchanged as to the low frequency component, and the predictive error component alone remains as the high frequency component.

The reproduced video signal shown in FIG. 5(d) is obtained as a sum of the predictive signal in FIG. 5(b) and the predictive error signal in FIG. 5(c), and contains all frequency components of the input video signal.

Complete prediction (predictive coefficient: 1) of the high frequency component of the video signal requires a long time until the reproduced high frequency component returns to the ordinary condition after random access.

If such a condition is undesirable, reducing the predictive coefficient lower than 1, for instance, to 0.8, can obtain normal pictures relatively fast although the coding efficiency lowers slightly.

Such processing can be realized by maintaining the high frequency characteristic of the LPF 45 in such a level as 20% without complete suppression.

When motion compensation of less than the pixel accuracy is used for interframe prediction, the motion compensation is applied to the signal of the preceding frame read out of the frame memory 43, and after that the signal is fed into the LPF 45.

In this motion compensation resampling processing is conducted and the high frequency component is somewhat suppressed owing to the characteristic of the filter. In such a case it is unnecessary to correct the predictive coefficient due to the characteristic of the LPF 45 as described above.

FIG. 6 is a block diagram illustrating an embodiment of the decoding apparatus corresponding to the coding apparatus of FIG. 3.

In FIG. 6, the coded data transmitted from the coding apparatus in FIG. 3 via a data input terminal 49 is supplied to an intraframe decoder 51. The decoder 51 decodes the intraframe-coded data to generate a reproduced predictive error signal which is then applied to a reverse predictive adder 53.

The adder 53 adds the reproduced predictive error signal to a predictive signal supplied from a subtractor 55 to generate a reproduced video signal. The reproduced signal is sent out, via a video signal output terminal 57, and also is applied to a frame memory 59.

The frame memory 59 supplies an output signal delayed by one frame from the input video signal to the LPF 61 and a subtractor 55. The output of the LPF 61 is connected to a terminal I of a switch 63. the structure and operation of the switch 63 are the same as those of the coding apparatus shown in FIG. 3. The output signal of the subtractor 55 is therefore supplied, as the same predictive signal as that in the coding apparatus of FIG. 3, to the adder 53.

FIG. 7 is a block diagram showing another embodiment of the predictive coding apparatus of the present invention. In this embodiment high and low frequency components of a video signal are respectively encoded, and intraframe prediction of the low frequency component is carried out in all frames.

An input video signal is supplied to a band dividing subtractor 67 and subsampler 69. In the subsampler 69, filtering as in the case of the LPF 45 of FIG. 3 is followed by subsampling of the same frequency band as that of the LPF 45. In FIG. 4, spatial frequencies, both vertical and horizontal, are halved.

The output signal of the subsampler 69 is applied to an intraframe encoder 71 and an oversampler 73, The coded data of the low frequency component, which is the output signal of the intraframe encoder 71, is transmitted to a decoder described later, via a data output terminal 75. The encoder 71 processes the subsampled video signal, and the number of pixels processed by the encoder 71 is one-fourth of the input video signal.

On the other hand, the oversampler 73 generates pixels deleted by the subsampler 69 for interpolation and makes the number of pixels the same as before. The output signal of the oversampler 73 is applied to the band dividing subtractor 67, and subtracted from the input video signal, thus obtaining a video signal having a high frequency component.

The output signal of the band dividing subtractor 67 is led to a predictive subtractor 77, where a predictive signal supplied from memory frame 79 in subtracted from that output signal. The output of the predictive subtractor 77, which becomes a predictive error signal, is intraframe-coded by an intraframe encoder 81, the output of which is transmitted to the decoder via the data output terminal 83 and, at the same time, applied to an intraframe decoder 85. The intraframe encoder 81, which encodes the predictive error signal of the high frequency component, processes the same number of pixels as that of the input video signal.

The predictive error signal reproduced by the intraframe decoder 85 is added to the corresponding predictive signal by a reverse predictive adder 87, and its output signal is delayed by one frame by the frame memory 79, and applied, as a predictive signal, to the predictive subtractor 77.

FIG. 8 is a block diagram representing an embodiment of the decoding apparatus corresponding to the coding apparatus of FIG. 7. An output signal of an intraframe decoder 99 contains a high frequency component, and therefore does not necessitate use of an LPF and a subtractor for predictive signal generation as in the case of the decoding apparatus of FIG. 6.

The input data of the low frequency component delivered at a data input terminal 89 is intraframe-decoded by an intraframe decoder 91, and applied to an oversampler 93. in the oversampler 93, a signal of the same number of pixels as that of an original picture is generated and applied to the adder 95.

On the other hand, the input data of the high frequency component delivered from a data input terminal 97 is converted into a reproduced predictive error signal by an intraframe decoder 99 and applied to a reverse predictive adder 101.

The adder 101 adds the reproduced predictive error signal and the predictive signal supplied from the frame memory 103, thus forming a reproduced picture signal of the high frequency component. The formed signal is applied to an adder 95 and also to the frame memory 103. The frame memory 103 delays the input signal by one frame and applies the delayed signal to the reverse predictive adder 101 as a predictive signal.

The adder 95 adds the signal of the low frequency component fed from the oversampler 93 and that of the high frequency component supplied from the adder 101, thereby forming a reproduced video signal which is sent out, via a video signal output terminal 105.

Figure 9:
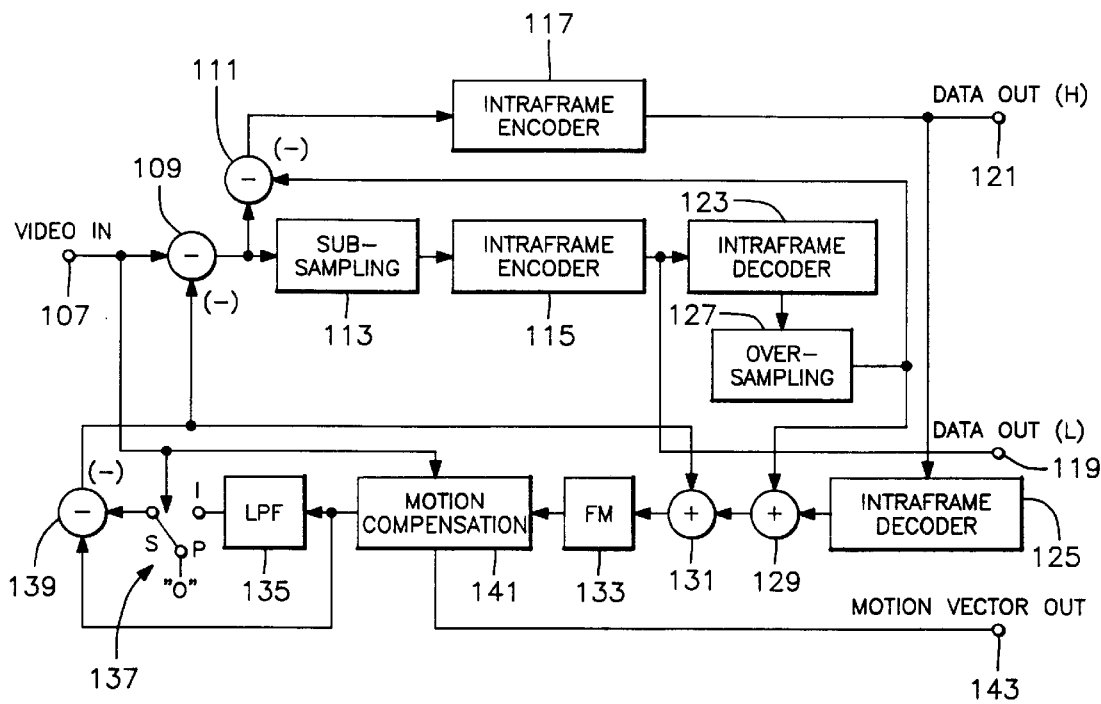
FIG. 9 is a block diagram illustrating still another embodiment of a predictive coding apparatus of the present invention.

FIG. 9 is a block diagram portraying another embodiment of the predictive coding apparatus of the present invention. In the embodiment of FIG. 9, an interframe predictive error signal is frequency-divided.

Consequently, after the intraframe decoding of both high and low frequency components, a predictive signal is generated by addition of the result of the intraframe decoding. The prediction by the predictive signal carries out motion compensation.

An input video signal, applied via a video signal input terminal 107, is subjected to subtraction of a predictive signal in a predictive subtractor 109, and its output signal, i.e., a predictive error signal, is applied to a band dividing subtractor 111 and a subsampler 113.

After the same processing in the subsampler 113 as in FIG. 7, the output signal is supplied to an intraframe encoder 115, whereas the output of the band dividing subtractor 111, which is a high frequency component, is supplied to an intraframe encoder 117. While the intraframe encoder 115 is for the subsampled low frequency component, the other intraframe encoder 117 is for the high frequency component.

The output data of both the intraframe encoders are transmitted to a decoding apparatus described later through data output terminals 119 and 121, respectively, and also concurrently applied to intraframe decoders 123 and 125, respectively.

The output signal of the intraframe decoder 123 is applied to an oversampler 127, and that of the interframe decoder 125 to an adder 129. The output signal of the oversampler 127 is applied to the adder 129 and the band dividing subtractor 111. The adder 129 adds both signal components applied to it, thereby forming a reproduced predictive error signal, which is supplied to a reverse predictive adder 131. The functions of the reverse predictive adder 131, frame memory 133, LPF 135, switch 137, and subtractor 139 are the same as in FIG. 3.

On the other hand, a motion compensator 141 detects the motion vector of every block by using a reproduced video signal delayed by one frame, which is an output signal of the frame memory 133, and the input video signal; generates a one-frame delayed signal which has been motion-compensated by the vector (although not correctly one-frame delayed because of the motion compensation); and supplies the signal to the LPF 135 and subtractor 139.

Furthermore data on the motion vector is necessary for the decoder, and therefore is transmitted from a motion vector output terminal 143 to the decoder.

Figure 10:
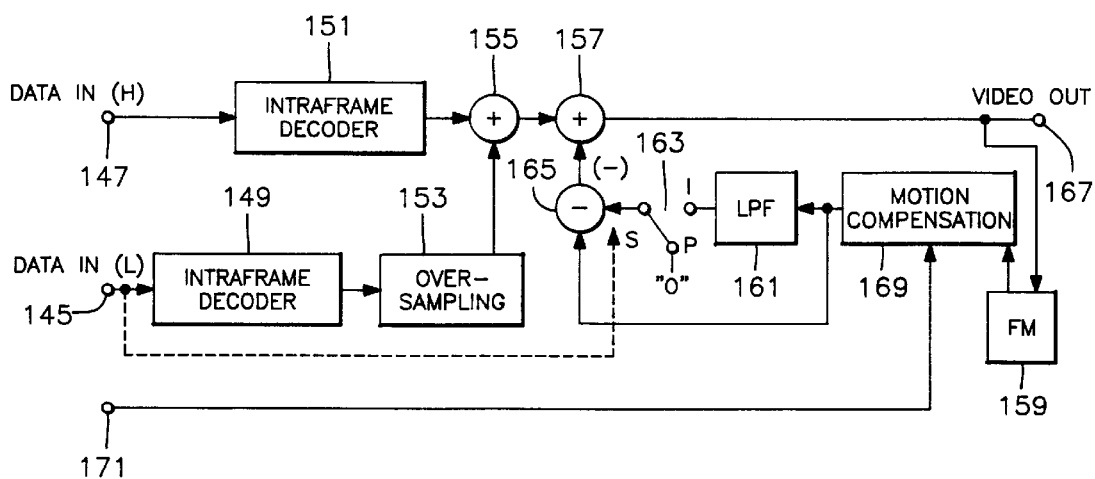
FIG. 10 is a block diagram illustrating an embodiment of a predictive decoding apparatus corresponding to the coding apparatus of FIG. 9.

FIG. 10 is a block diagram representing the decoding apparatus corresponding to the coding apparatus of FIG. 9.

Input data entered through data input terminals 145 and 147 is intraframe-decoded by intraframe decoders 149 and 151, respectively. A low frequency component of the signal delivered from the decoder 149 is applied to the oversampler 153 in which the number of pixels is made the same as that of the original picture.

An adder 155 adds a high frequency component delivered from the decoder 151 and a low frequency component delivered from the oversampler 153, thereby forming a reproduced predictive error signal.

The functions of a reverse predictive adder 157, frame memory 159, LPF 161, switch 163, subtractor 165 are the same as in FIG. 3. The output signal of the adder 157 is sent out via a video signal output terminal 167 as a reproduced picture.

On the other hand a motion compensator 169 makes motion compensation on the output signal from the frame memory 159 by means of the values of motion vectors supplied from a motion vector data input terminal 171, and feeds the result of compensation to the LPF 161 and subtractor 165.

Figure 11A:
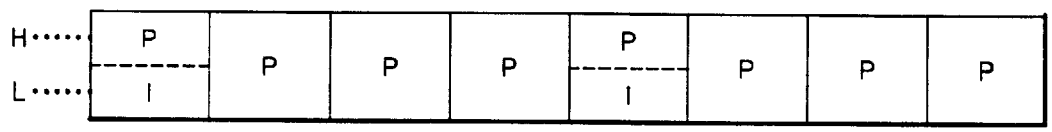
FIGS. 11A to 11D portray the frame structure in respective embodiments.
Figure 11B:
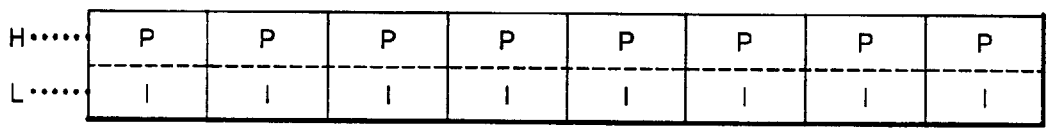
Figure 11C:
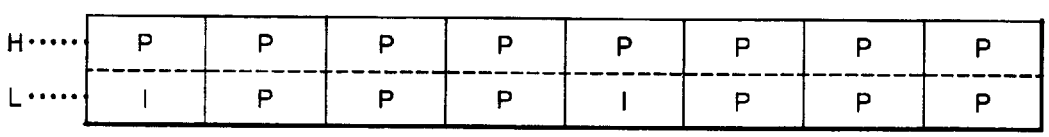

FIGS. 11A to 11C show frame structure in each of the foregoing embodiments. Each block is a frame, and the broken line separates a high frequency component (above the line) from a low frequency component (under the line). Letter I denotes a frame coded by independent intraframe coding and letter P a frame coded by interframe predictive coding. Letter B denotes a frame coded by prediction from the preceding and succeeding frames.

Figure 11D:
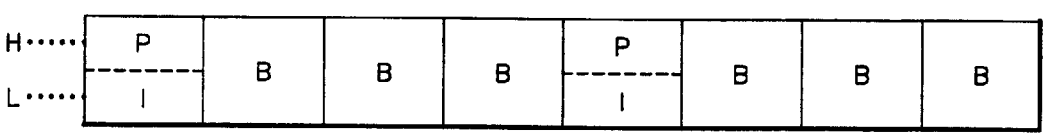

Accordingly, as shown in FIG. 11D, it is also allowed to change the frames of P alone in FIG. 11A to frames of B so as to predict a P-frame from the preceding P-frame and to predict B-frames from the preceding and succeeding P-frames.

The above embodiments are described so that the signal processing uses frames as a unit of coding and decoding. However, the same description can be applied to signal processing wherein fields of interlace signals are used as the unit.

In the embodiments described above in detail, the low frequency components only are subjected to the independent intraframe coding, while the high frequency components are coded by interframe prediction. This type of signal processing makes possible the random access and search to the low frequency components as in conventional cases, and improves coding efficiency of the high frequency components by means of predictive processing, thus realizing substantial reduction of the quantity of coded output data as a whole.

In one aspect of random access, although the pictures reproduced at access points are composed of low frequency components, the visual characteristic of the pictures can be followed without futility. That is, because the human sense of sight becomes rather weak directly after a picture abruptly changes or moves, such delay in the reproduction of high frequency components as in the foregoing embodiments is not so serious of a problem, In addition, smooth search pictures can be obtained by high speed search even though the search is limited to low frequency components only.

What is claimed is:

1. An apparatus for coding a video signal, comprising:

means for generating a first interframe or interfield predictive signal on the basis of an already coded video signal of frame or field;

means for generating a second interframe or interfield predictive signal which low frequency components are suppressed by suppressing low frequency components of the first interframe or interfield predictive signal;

means for generating a predictive error signal on the basis of an input video signal and the second interframe or interfield predictive signal; and coding means for intraframe or intrafield coding the predictive error signal.

2. An apparatus for decoding a video signal, comprising:

means for intraframe or intrafield decoding a code transmitted from a coding apparatus to obtain a decoded predictive error signal;

means for generating a first interframe or interfield predictive signal on the basis of an already decoded video signal of frame or field;

means for generating a second interframe or interfield predictive signal which low frequency components are suppressed by suppressing low frequency components of the first interframe or interfield predictive signal; and reproducing means for reproducing the video signal by adding the decoded predictive error signal and the second predictive signal.

* * * * *